United States Patent

[11] 3,608,943

| | | |
|---|---|---|
| [72] | Inventor | Frank T. Gostomski<br>246 West Eighth St., Wahoo, Nebr. 68066 |
| [21] | Appl. No. | 829,463 |
| [22] | Filed | June 2, 1969 |
| [45] | Patented | Sept. 28, 1971 |

[54] EXTENSIBLE AUTOMOBILE BUMPER
8 Claims, 6 Drawing Figs.

[52] U.S. Cl. ................................................ 293/73,
5/119, 280/150, 293/99
[51] Int. Cl. ........................................................ B60r 19/02,
B60r 27/00, B61f 19/04
[50] Field of Search ............................................. 5/119;
280/150 R, 150; 293/73, 99

[56] References Cited
UNITED STATES PATENTS
1,474,929  11/1923  Fagan........................... 5/119
3,436,096  4/1969   Rogge ......................... 280/150
3,488,077  1/1970   Miller........................... 293/73

*Primary Examiner*—Arthur L. La Point
*Assistant Examiner*—Howard Beltran
*Attorney*—Thomas W. Secrest ABSTRACT: A bumper extension construction is disclosed comprising plate hangers adapted to be detachably secured to the opposite sides of the frame of an automobile and to depend therefrom. Spaced U-shaped brackets have their legs welded to said plate hangers to provide spaced, longitudinally extending passageways. In each passageway a bumper arm is slidably mounted for extension or retraction. Spring-loaded, wedge-shaped catch means are provided so a selected extension can be maintained without the use of bolts or tools, thus eliminating any looseness of parts during travel in forward and reverse directions. Also, spring-loaded wedges are provided to eliminate mechanical rattles between the bumper arms and the frame means forming the longitudinal passageways for the reception of said bumper arms.

PATENTED SEP 28 1971

INVENTORS.
Frank T. Gostomski
BY
TW Secrest

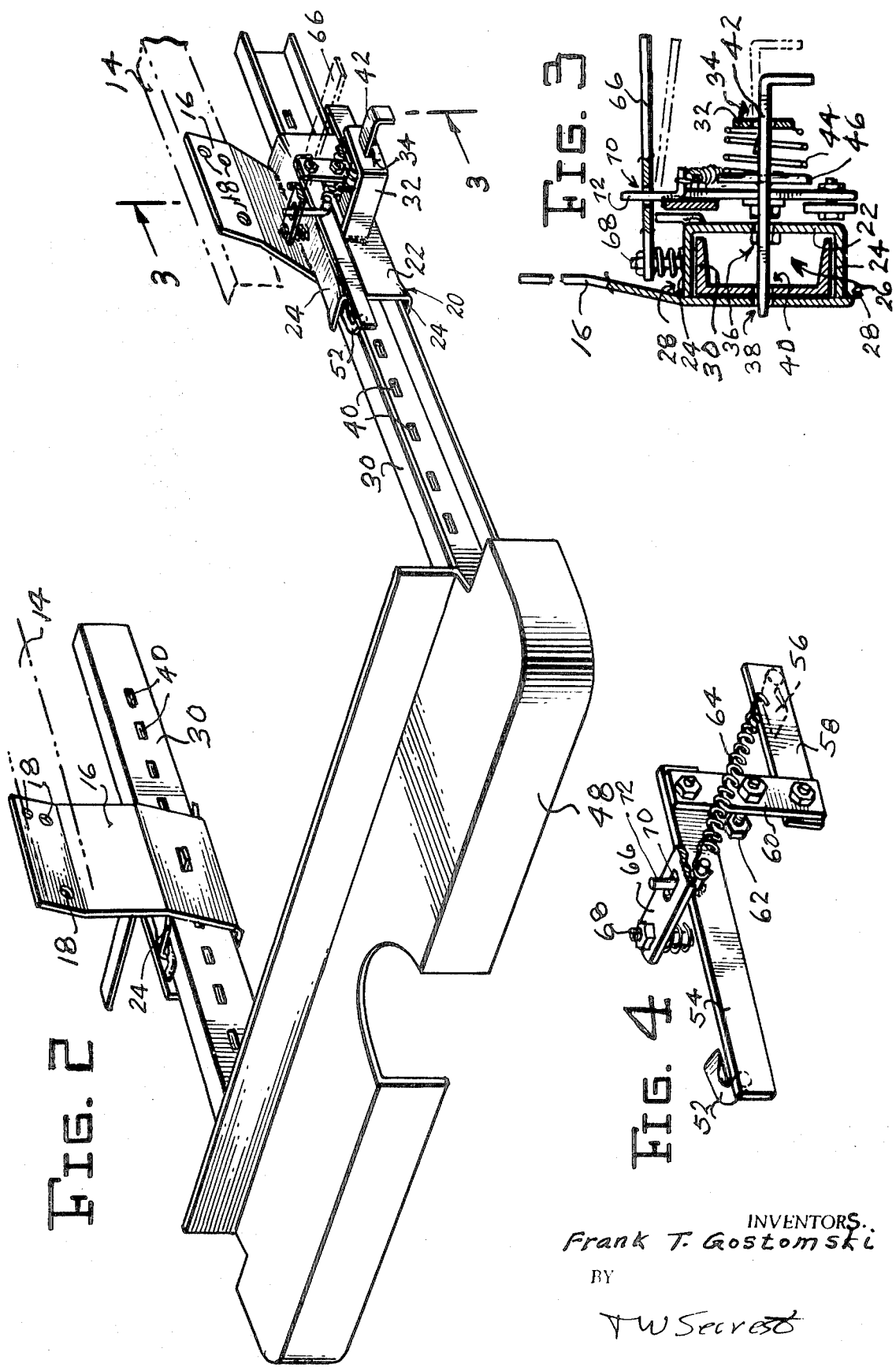

EXTENSIBLE AUTOMOBILE BUMPER

This invention relates to a bumper arm extension construction and more particularly relates to a construction wherein plate hangers are provided to be secured to the conventional side rails of the frame of an automobile and which plate hangers carry the bumper arm construction of this invention.

It was common practice in the prior art to provide a permanent and generally riveted or welded connection between the arms, supporting the rear bumper of an automobile, and the frame of the automobile. Such construction has the shortcoming that if the body style of the automobile is altered (by the removal of the original body style and replacement by a body style which is longer or shorter than the original body style or by the removal of the original body style), the bumper is too far forward so that it can no longer function as a bumper as portions of the body extend rearwardly of the bumper, or the said bumper is too far rearwardly to be adequately supported or extends so far rearwardly of the body to be visibly misleading and is thus a traffic hazard. Also, in the case of rearwardly overhanging loads, a fixed bumper cannot be adjusted to adequately protect the overhanging loads or to protect overhauling traffic from damage by said overhanging loads.

It is an object of this invention to provide a sturdy, simple and economical construction providing for a detachable and adjustable automobile bumper extension construction.

It is a further object to provide for releasing an adjusting means which are simple and certain in their operation and which tend to withstand abuse and wear which must be anticipated in connection with the normal use of automobile bumpers.

It is a further object to provide parts having ample clearance for ready adjustments, providing for quick adjustment without the use of tools, and at the same time characterized by being free of mechanical rattles and noises normal to moving metal parts having ample clearances.

Other objects of this invention will be apparent or will be implicit as the invention is described in detail in connection with the accompanying drawings, throughout which like reference numerals indicate like parts, and wherein:

FIG. 2 is a perspective view, with a fragment of the automobile frame shown in phantom, of a device of this invention;

FIG. 3 is a sectional view, with parts shown in elevation, and taken substantially on broken line 3—3 of FIG. 2;

FIG. 4 is an enlarged perspective view of the releasable catch means of this invention;

Figure 1:
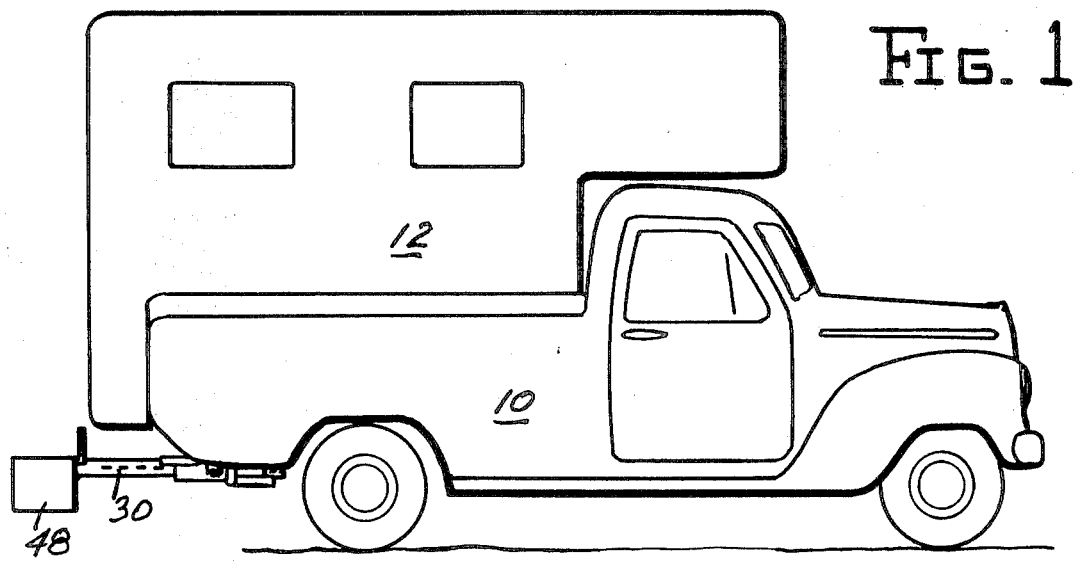
FIG. 1 is an elevational view of an automobile camper with the invention hereof attached thereto.
Figure 5:
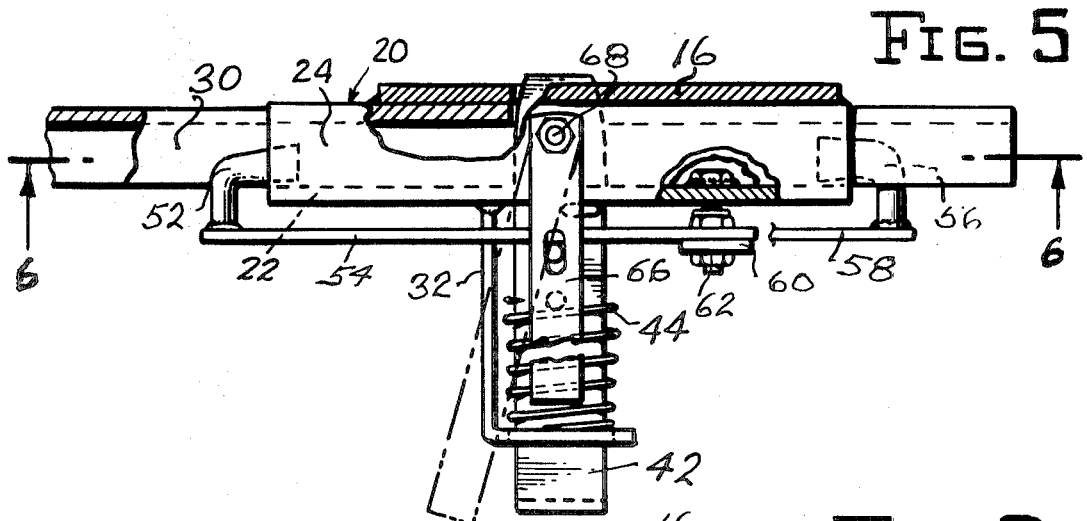
FIG. 5 is a fragmentary sectional view, with parts in plan, of the construction of FIG. 3.

In FIG. 1, an automobile camper is illustrated comprising a pickup truck 10 and a camper body 12. The invention may be attached to the frame of an automobile and thus the frame 14 of an automobile camper 10, 12 is illustrative of the frame of any automobile. A plate hanger member 16 is preferably detachably secured to the frame 14 by way of bolts (not shown) extending through holes 18 in the hanger member 16 and through matching holes in the frame 14.

A U-shaped bracket 20 is preferably formed of a base portion 22 (see FIG. 3) and two parallel legs 24 extending at right angles therefrom. The legs 24 of the U-shaped bracket 20 are secured to the plate hanger member 16 as by weldments 28. Thus, there is formed a longitudinally extending passageway 26 between said plate hanger member 16 and said U-shaped bracket 20 and which passageway 26 is preferably of rectangular shape in section. Passageway 26 having other cross section areas, as square or round, may be employed, provided bumper arms 30 having matching cross sections are employed.

Two slidably hanger members 16 and associated U-shaped brackets 20 are provided and thus there are two spaced-apart longitudinally extending passageways 26. In each of the passageways 26 there is slidably mounted a bumper arm 30.

The bumper arms 30 should be of a type to provide the desired strength to resist bending as the bumper arms and the crosspiece connecting the same are subject to being contacted by the bumpers of other automobiles and other traffic hazards. A section of one form of bumper arm 30 is a U-shape in section both for strength and a shape which will readily slide within the preferably rectangular passageway 26.

A bracket 32 is secured to each U-shaped bracket 20, as by welding, and each bracket 32 is provided with a slot 34. Each slot 34 is aligned, and registers with a slot 36 in a U-shaped bracket 20 and is also aligned, and registers with a slot 38 in a plate hanger member 16. Each bumper arm 30 is provided with a plurality of longitudinally spaced slots 40. A selected slot 40 in a bumper arm 30, is movable into registration with slots 34, 36, and 38 and when said four slots are in registration, a wedge-shaped tine 42 is movable, preferably under the influence of spring 44, through all said slots 34, 36, 38, and 40 and thus the bumper arm may be held in longitudinal adjusted position. A manner of spring loading a tine 42 is to locate a compression spring 44 around tine 42 and abut one end thereof against the bracket 32 and the other end against a pin 46 carried by the tine 42.

The two bumper arms 30 are interconnected by a crosspiece member 48 which may also include a step plate as shown. This member 48 should be rather strong and nonfragile as it functions as the contact member of the bumper and will be in contact, from time to time, with the bumpers of other automobiles and with other objects.

The ln arms 30 should slide freely in the longitudinally extending passageway 26, even though the said arms may be contacted by other automobiles during normal traffic conditions and be thus somewhat "battered." In other words, a rather loose fit is preferable because of the possible contacts during normal traffic conditions. With such preferred looseness, there is the resultant noise factor because of the contact between two metal parts. In order to eliminate such possible noise and mechanical rattles, wedges are employed.

Figure 6:
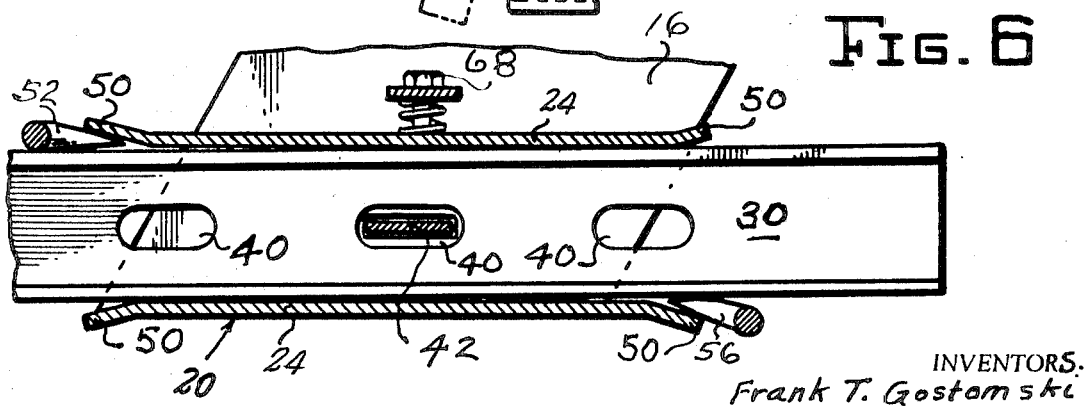
FIG. 6 is a sectional view, with parts in elevation, and taken substantially on broken line 6—6 of FIG. 5.

Thus, preferably, the marginal edge portions of the U-shaped bracket 20 and at the edge portions 50 thereof (see FIG. 6) are bent outwardly and away from the bumper arms 30 to provide and opening to readily receive a wedge between the brackets 20 and the arms 30 to prevent metallic rattles. Preferably, there are two wedges for each U-shaped bracket 20.

As shown detached in FIG. 4, wedge 52 is carried by one end portion of arm 54 and wedge 56 is carried by one end portion of the arm 58. Arms 54 and 58 are pivotally connected at their other end portions to the ends of a cross link 60. Cross link 60 is in turn pivoted at its mid portion to the U-shaped bracket 20 by nut and bolt means 62. As link 60 turns in one direction, the wedges 52 and 56 move into wedging position into the space between diagonally opposed marginal edge portions 50 of a U-shaped bracket 20 and a bumper arm 30 and when said cross link 60 turns in the other direction, the wedges 52 and 56 are moved out of wedging position. The linkage is preferably spring loaded to move the wedges 52 and 55 into wedging position. Thus, a tension spring 64 is connected between arms 54 and 58 and urges cross link 60 in a given direction (clockwise direction as shown in FIG. 4) and the wedges 52 and 56 are urged into wedging position. Movement of the cross link 60 in the opposite direction (counterclockwise, as shown in FIG. 4) is accomplished by a lever 66 having an end portion thereof pivoted to U-shaped bracket 20 by pivot means 68. A slot 70 in lever 66 receives a pin 72 carried by arm 54. Thus, by moving lever 66, and in turn arms 54 and 58, wedges 52 and 56, carried by said arms, are moved out of wedging position when desired.

From the foregoing it will now appear that there is provided in this invention, a bumper extension construction which may be added to an automobile, such as for example, the pickup truck 10 with or without the camper body 12 carried thereby.

The said bumper construction comprises spaced-apart plate hanger member 16, each of which is preferably secured to the frame 14 of an automobile. To each plate hanger member 16 is secured a U-shaped bracket 20 to provide a longitudinally extending passageway 26 between said member and said bracket. Preferably, each U-shaped bracket 20 comprises a base portion 22 and parallel legs 24 extending at right angles therefrom to provide a passageway 26 which is rectangular in section. A way of securing said legs to the said plate member 16 is by the weldments 28. The aforesaid construction is provided on both sides of the vehicle so that there are spaced parallel passageways 26.

In each passageway 26 there is slidably mounted a bumper arm 30, which for strength purposes, may be U-shaped in section. The distance that a bumper arm 30 extends beyond the frame 14 of an automobile is adjustable and releasable catch means are provided for securing each arm 30 in a passageway 26 and in a longitudinally adjusted position. A form of such catch means comprises slots 40 in arms 30, slots 36 in U-shaped brackets 20, slots 38 in plates 16, slots 34 in bracket 32, and a bar or tine 42 movale into and out of said slots when in registration. Thus, a slot 40 in an arm 30 may be selected to be in such registration to provide for the desired extension of the bumper extension construction. Preferably, the bar or tine 42 is spring loaded to move into locking position and this is accomplished by compression spring 44 functioning between bracket 32 and a pin 46 carried by tine 42.

In order to provide ample clearance between the bumper arms 30 and the walls forming the longitudinal passageways 26 so that said bumper arms will slide freely even if they are somewhat damaged by expected bumping and contact with the parts of other automobiles during normal traffic conditions, a possible mechanical rattle or noise is probable. Thus, the marginal corner edge portions 50 of the U-shaped brackets 20 are bent outwardly to provide spaces into which wedges 52 and 56 may be inserted to eliminate such mechanical rattles. Preferably, the wedges 52 and 56 are carried by arms 54 and 58 and the arms 54 and 58 are interconnected by a cross link 60 which is pivoted at its central portion. Upon turning of the cross link 60 in one direction, the wedges 52 and 56 move into wedging position into diagonally opposed openings between the U-shaped brackets 20 and the legs of the bumper arms 30. Turning movement of the cross link 60 in the opposite direction releases said wedges 52 and 56. Also, movements of said wedges in one direction to cause wedging is preferably under spring tension. Thus, a tension spring 64 is connected between arms 54 and 58. To release said tension, a lever 66 has one end portion pivotally supported by pivot means 68 and has a slot 70 at a mid portion to slidably engage a pin 72 (carried by arm 54). By moving lever 66 in the appropriate direction, spring 64 is extended, and wedges 52 and 56 are moved out of wedging position and the bumper arms 30 may be extended or retracted provided the tines 42 are moved out of the slots 38 and 40.

Obviously, changes may be made in the forms, dimensions and arrangements of the parts of this invention without departing from the principle thereof, the above setting forth only preferred forms of embodiment of this invention.

Having presented my invention, what I claim is:

1. A bumper extension construction comprising two spaced plate hanger members adapted to be supported by the spaced-apart side rails of the frame of an automobile; and, a bracket having leg portions thereof secured to each said hanger member and providing a longitudinally extending passageway between said bracket and said hanger member; a bumper arm slidably mounted in said passageway; and releasable catch means securing said arm in longitudinally adjusted positions in said passageway; and, said bracket comprises a base portion and two parallel legs extending at right angles therefrom and the longitudinally extending passageway is rectangular in section.

2. The combination of claim 1, wherein the bumper arm is provided with longitudinally spaced openings, the bracket is provided with an opening movable with which a selected opening of said spaced openings in said bumper arm may be registered, and a wedge-shaped stop bar is movable into and out of stop position with said registering openings.

3. The combination of claim 2, wherein said wedge-shaped stop bar is spring loaded and is resiliently moved into stop position.

4. A bumper extension construction comprising two spaced plate hanger members adapted to be supported by the spaced apart side rails of the frame of an automobile; a bracket having leg portions thereof secured to each said hanger member and providing a longitudinally extending passageway between said bracket and said hanger member; a bumper arm slidably mounted in said passageway; and releasable catch means securing said arm in longitudinally adjusted positions in said passageway and, said bumper arm is spaced from a marginal portion of said bracket to provide a space, and wedge means is movable into and out of said space.

5. The combination of claim 4, wherein a marginal portion of a leg portion of said bracket is spaced from the adjacent surface of said bumper arm providing a space therebetween; and wedge means is movable into and out of said space.

6. The combination of claim 5, wherein said wedge means is spring loaded and is resiliently urged into wedging position.

7. The combination of claim 4 wherein diagonally opposed leg portions of said bracket each has a marginal portion spaced from the adjacent surface of said bumper arm providing spaces therebetween; and a wedge means is movable into and out of said spaces.

8. The combination of claim 7, wherein each of said wedge means is pivotally connected to an opposite end portion of a centrally, pivotally mounted lever, whereby said wedge means move in opposite directions to wedge; link means to move said wedges out of wedging position; and spring means resiliently urging said wedge means into wedging position.